W. G. RICH.
RECEPTACLE.
APPLICATION FILED JULY 18, 1912.
1,164,961.                           Patented Dec. 21, 1915.
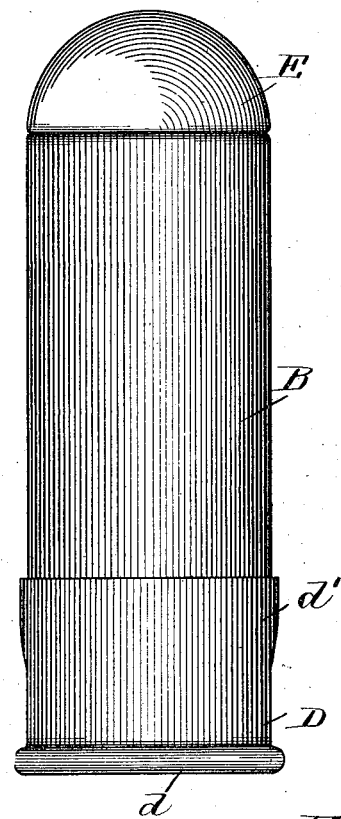
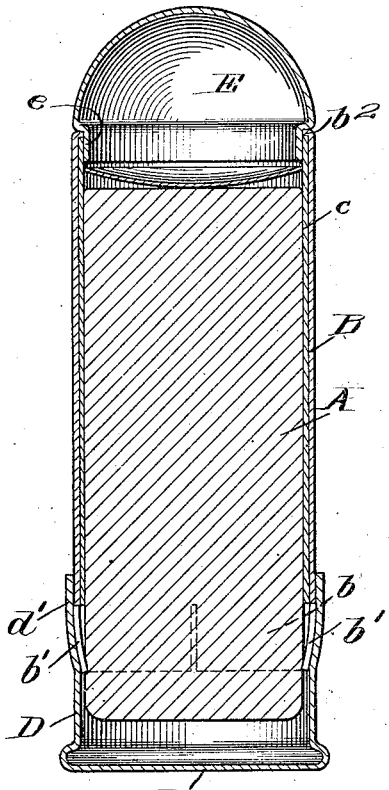
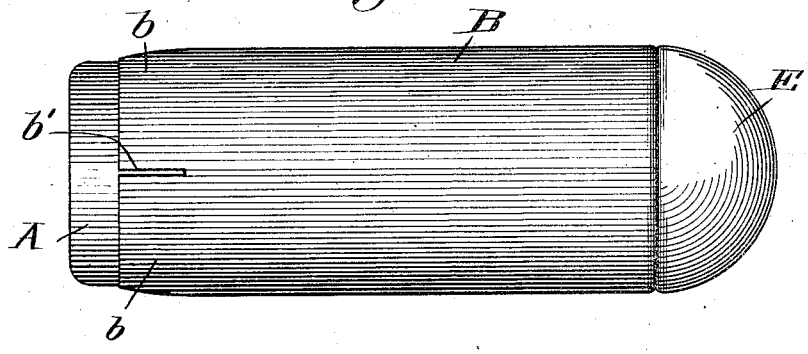
Inventor
Willard G. Rich

UNITED STATES PATENT OFFICE.

WILLARD G. RICH, OF ROCHESTER, NEW YORK.

RECEPTACLE.

1,164,961.  Specification of Letters Patent.  Patented Dec. 21, 1915.

Application filed July 18, 1912. Serial No. 710,202.

*To all whom it may concern:*

Be it known that I, WILLARD G. RICH, of the city of Rochester, in the county of Monroe and State of New York, have invented certain new and useful Improvements in Receptacles; and I do hereby declare the following to be a full, clear, and exact description of the same, reference being had to the accompanying drawings, forming a part of this specification, and to the reference numerals marked thereon.

My present invention has for its object to provide a holder or receptacle for shaving soap in stick form, which will not corrode under the action of moisture and chemical agents embodied in the soap; which will permit the latter to be projected gradually as required for use; which will preserve the soap against becoming dry and hard and which is closed by caps so formed that the receptacle will stand upright only on one end thus preventing any excess moisture remaining at any time on the exposed end of the stick from softening the stick as a whole or fouling the container.

To these and other ends the invention consists in certain improvements and combinations of parts all as will be hereinafter more fully described, the novel features being pointed out in the claims at the end of the specification.

In the drawings: Figures 1 and 2 are side elevations of a receptacle illustrating one embodiment of my invention, the first view showing the receptacle closed and the second showing the cap removed with the exposed end of the soap stick in readiness for use, and Fig. 3 is a vertical sectional view.

Similar reference numerals throughout the several figures indicate the same parts.

A receptacle embodying my invention is adapted to be used as a container for stick material which is to be consumed, such as stick shaving soap, indicated by A, and comprises a cylindrical tubular body or shell B only slightly larger in diameter than the inclosed soap stick and having at one end a flanged portion $b$ which is turned inwardly sufficiently to frictionally engage the soap stick. This flange may be provided with a plurality of longitudinally extending slots $b'$ to add flexibility to it and the flange may also be turned inwardly to such an extent that its edge, or the end of the body, may bite into the wall of the soap stick sufficiently to prevent its being forced backwardly into the receptacle. This however, I do not deem altogether necessary, preferring rather to provide other means for preventing this movement, as only slight friction is required of the flanges $b$ to hold the soap stick under general conditions of use and also prevent the entrance of moisture between the contiguous walls of the stick and container.

The container is made slightly greater in length than the soap stick and in its rear end is placed a follower in the form of a disk of such a diameter that its periphery engages the inner wall of the container when an attempt is made to move it longitudinally therein while held in a plane extending transversely thereto, a result which occurs when an attempt is made to force the soap stick rearwardly. The disk may be made of thin material and is preferably dished inwardly making its rear face concaved. This shape adds to the security with which it binds itself in place in resisting rearward movement and also facilitates adjusting it forwardly. It may be necessary or desirable, with some soaps or other substances, to hold them out of contact with the container and in such instances I provide a lining C of paper, or other suitable material, which closely fits the receptacle and is held against rearward movement therein by a small flange $b^2$. The lining C may be made of any material which possesses the quality of being slightly yielding and for this reason I prefer one of a fibrous nature which, because it will yield under pressure, differs from the harder substance, such as metal or celluloid, of which the receptacle may be composed. In the use of shaving sticks, the exposed ends are moistened and if the container as a whole is stood upright, viz: with the exposed end of the soap stick uppermost, any excess moisture may gravitate or work its way downwardly within the walls of the container. This not only tends to befoul the latter but it also causes the soap stick to become softened. In order to obviate these difficulties I provide the receptacle with caps of such form that it can only stand upright on the end at which is the exposed end of the soap stick. To this extremity of the container I fit a cap D having the flat face $d$ and to its other extremity I fit the rounded, semispherical, cap E. The latter may be generally described as dome shaped, which term may be understood to include various modifications of contour any one of which would fail to serve as a support by means of which the receptacle might be held in an upright position. In order to prevent these caps from being misplaced, or reversed, I provide them with flanges $d'$ and $e$ respectively, the former fitting the exterior of the body and the latter the interior thereof.

The container may be made of any suitable material but I prefer to construct it of some substance other than metal, such as celluloid, as most of the metals which are adapted to be formed into the shape shown, oxidize very readily and either disintegrate, or accumulate verdigris under the influence of moisture and the chemical ingredients incorporated in the soaps during manufacture.

I claim as my invention:

1. A shaving stick holder embodying an open-ended cylindrical receptacle having means at its forward end for restraining the movements of a shaving stick placed therein in a forward direction and at its other end with an inturned flange, a yielding lining in the receptacle held against longitudinal movement by the restraining means at one end and said flange at the other end of the receptacle, and a thin concave circular disk fitting within the lining and movable longitudinally of the receptacle in one direction, and adapted to lock therein by peripheral engagement with the lining when pressure is exerted on its convex surface.

2. A shaving stick holder comprising a tubular container, a flat top cap having a flange fitting the exterior of the container and a rounded cap having a portion fitting the interior of the container, said caps being non-reversible on the container.

3. A tubular shell adapted to receive a stick of shaving soap having an open receiving end in which said stick is inserted and an open discharge end from which said stick is projected for use, a flat top cap fitting said discharge end and forming a surface for supporting the shell upright with the used end of the stick lowermost and a second cap fitted to the other extremity of the shell and having a portion dome shaped so that it will not support the shell in an upright position.

WILLARD G. RICH.

Witnesses:
G. WILLARD RICH,
RUSSELL B. GRIFFITH.